Feb. 18, 1958   H. VAN GELDER   2,823,716
SWEET CORN CUTTER
Filed Jan. 4, 1957
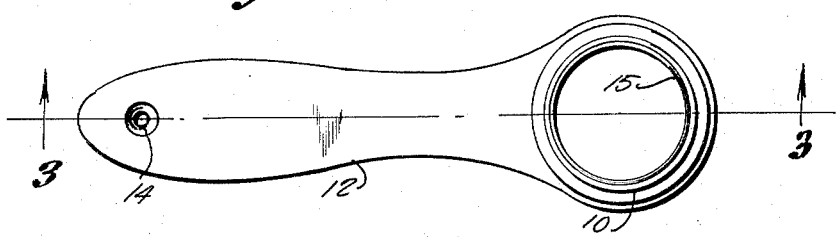
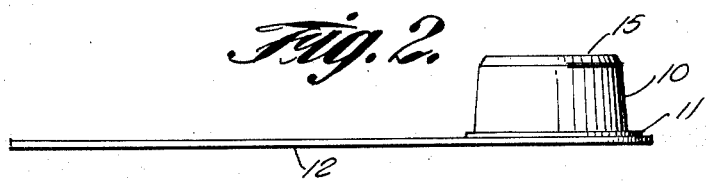
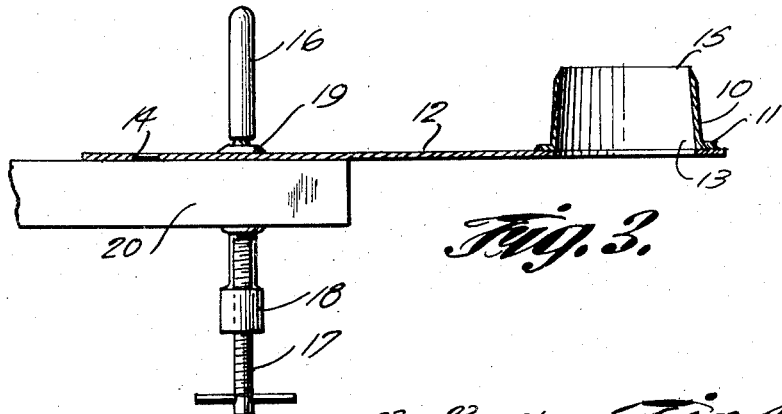
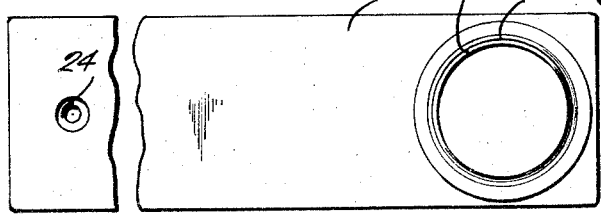
INVENTOR.
Harold Van Gelder
BY Victor J. Evans & Co.
ATTORNEYS

United States Patent Office 2,823,716
Patented Feb. 18, 1958

2,823,716

SWEET CORN CUTTER

Harold Van Gelder, Ocheyedan, Iowa

Application January 4, 1957, Serial No. 632,565

1 Claim. (Cl. 146—4)

This invention relates to devices for cutting kernels of corn from cobs and particularly sweet corn, and in particular a device adapted to be held in the hand of an operator or secured by a C-clamp to the edge of a table or the like and in which an ear of corn is pressed through a cylindrical sleeve having a sharp cutting edge whereby the kernels are readily cut from the cob with the kernels dropping to the sides and the cob passing through the sleeve.

The purpose of this invention is to provide an improved device for readily cutting kernels of sweet corn from cobs to facilitate the preparation of the corn for table use and also for canning, freezing, and the like.

Various types of devices have been provided for cutting kernels of corn from cobs, however, such devices resort to mechanical means for forcing ears of corn through circular openings and other devices for slicing kernels of corn from the cobs and it has been found more desirable to use a relatively small cutting tool in which the tool is adapted to be held in one hand or clamped upon a utility board or edge of a table as an ear of corn in pressed through the device with the other hand.

The object of this invention is, therefore to provide means for comfortably holding a cylindrical cutter on a handle to facilitate removing kernels of corn from a cob.

Another object of the invention is to provide a device for removing kernels of corn from cobs in which the device may be carried, such as in a pocket, from one location to another.

A further object of the invention is to provide a sweet corn cutter which is of a simple and economical construction.

With these and other objects and advantages in view the invention embodies a handle adapted to be gripped in one hand having a circular outer end with a cylindrical sleeve having a sharp extended edge mounted on the outer end of the handle and positioned to register with an opening through the handle.

Other features and advantages of the invention will appear from the following description taken in connection with the drawing, wherein:

Figure 1 is a plan view of the improved cutter for removing kernels of corn from cobs.

Figure 2 is a side elevational view of the cutter shown in Fig. 1.

Figure 3 is a longitudinal section through the corn cutter taken on line 3—3 of Fig. 1 and showing the device secured by a C-clamp to the edge of a household cutting board or table.

Figure 4 is a plan view, similar to that shown in Fig. 1, showing a modification wherein the cutter is provided with a straight handle.

Referring now to the drawing wherein like reference characters denote corresponding parts the improved sweet corn kernel cutter of this invention includes a tapering cylindrical sleeve 10 secured by a flange 11 to a handle 12 having an opening 13 in registering relation with the sleeve and a countersunk opening 14 in the opposite end and, as illustrated in Fig. 3, the extended end of the sleeve 10 is beveled to provide a sharp cutting edge 15.

The circular cutting element or sleeve 10 may be secured to or inserted through the handle 12 or formed on the end of the handle by other suitable means.

With the parts as illustrated in Figs. 1, 2 and 3 the handle 12 may readily be held in one hand as an ear of corn is pressed through the circular cutter with the small end or tip of the ear started through the cutter. With a slight turning of the ear the kernels are readily removed from the cob and as the cob passes through the handle the lower end of the cob is gripped with one hand and so that it may be pulled through the cutting elements.

The device may be held in one hand as hereinbefore described or the handle may be secured to a utility board on table edge with a C-clamp 16 having a thumb screw 17 threaded in a hub 18 on the lower end and with one end 19 of the clamp resting upon the handle of the cutter and the upper end of the screw 17 bearing against the lower surface of the cutting board 20.

In the design illustrated in Fig. 4 a circular cutter 21, similar to the sleeve 10 is positioned on a bar 22, the bar having an opening 23 positioned in registering relation with the cutter 21 and also an opening 24 by which the bar may be positioned upon a hook or the like when not in use.

The device may be made of steel or other suitable material and may be provided in different sizes to correspond with sizes of ears of corn from which the kernels are cut.

It will be understood that other modifications, within the scope of the appended claim, may be made in the design and arrangement of the parts without departing from the spirit of the invention.

What is claimed is:

A corn kernel cutter comprising a handle, the side edge portions of said handle being recessed inwardly and adapted to be held in one hand, there being a circular opening in the opposite end of said handle, a tapered sleeve of frusto-conical formation registering with said circular opening, said sleeve being secured to said handle, said sleeve including one end of a diameter corresponding to a corncob and arranged contiguous to said handle, the outer end of said sleeve being of reduced diameter, the diameter of the circular opening in the handle being equal to the diameter of the sleeve at the large end thereof, said sleeve having a smooth inner surface, the outer surface of said sleeve adjacent the outer end thereof being tapered to provide a sharp cutting edge, said sharp cutting edge extending a short distance only so that the major portion of the sleeve on the outside is smooth.

References Cited in the file of this patent

UNITED STATES PATENTS

| | | |
|---|---|---|
| 1,753,305 | Spalding | Apr. 8, 1930 |
| 2,447,301 | Wright | Aug. 17, 1948 |
| 2,692,628 | Elsaesser | Oct. 26, 1954 |